US008868581B2

(12) United States Patent
Ryu et al.

(10) Patent No.: US 8,868,581 B2
(45) Date of Patent: Oct. 21, 2014

(54) COMMUNICATION DEVICE AND METHOD OF CONTROLLING OPERATION OF COMMUNICATION DEVICE

(75) Inventors: Je Hun Ryu, Gyeonggi-do (KR); Hyeoun Joo So, Incheon (KR); Geun Cheol Lim, Incheon (KR)

(73) Assignee: LG Electronics Inc., Seoul (KR)

( * ) Notice: Subject to any disclaimer, the term of this patent is extended or adjusted under 35 U.S.C. 154(b) by 954 days.

(21) Appl. No.: 12/324,750

(22) Filed: Nov. 26, 2008

(65) Prior Publication Data
US 2009/0157632 A1  Jun. 18, 2009

(30) Foreign Application Priority Data
Dec. 18, 2007  (KR) ........................ 10-2007-0133493

(51) Int. Cl.
*G06F 17/30*  (2006.01)
*H04L 29/08*  (2006.01)
*H04W 4/02*  (2009.01)

(52) U.S. Cl.
CPC ................ *H04W 4/02* (2013.01); *H04L 67/18* (2013.01); *H04L 67/36* (2013.01)
USPC .......................................... 707/758; 707/759

(58) Field of Classification Search
USPC .................... 707/758, 770, 796, 822
See application file for complete search history.

(56) References Cited

U.S. PATENT DOCUMENTS

| 6,868,333 | B2 * | 3/2005 | Melen ........................... 701/482 |
| 7,783,419 | B2 * | 8/2010 | Taniguchi et al. ............. 701/208 |
| 2002/0068583 | A1 * | 6/2002 | Murray ......................... 455/456 |
| 2002/0078209 | A1 * | 6/2002 | Peng ............................. 709/227 |
| 2002/0123329 | A1 * | 9/2002 | Murray ......................... 455/414 |
| 2004/0205766 | A1 * | 10/2004 | Lee et al. ...................... 719/311 |
| 2004/0260191 | A1 * | 12/2004 | Stubbs et al. ................. 600/520 |
| 2004/0260562 | A1 * | 12/2004 | Kujirai ......................... 704/275 |
| 2004/0260766 | A1 | 12/2004 | Barros et al. |
| 2007/0038761 | A1 | 2/2007 | Tebeka |
| 2008/0102840 | A1 * | 5/2008 | Ahn .............................. 455/440 |
| 2012/0096249 | A1 * | 4/2012 | Rubin et al. ..................... 713/1 |

FOREIGN PATENT DOCUMENTS

| CN | 1759588 | 4/2006 |
| EP | 1119211 A | 7/2001 |
| KR | 10-2006-0012390 | 2/2006 |
| KR | 10-2006-0027585 | 3/2006 |
| WO | 2004004372 A | 1/2004 |

* cited by examiner

*Primary Examiner* — Etienne Leroux
*Assistant Examiner* — Fariborz Khoshnoodi
(74) *Attorney, Agent, or Firm* — Lee, Hong, Degerman, Kang & Waimey

(57) ABSTRACT

A communication device and method of controlling an operation of a communication device are provided, by which an application can be efficiently selected according to location information. The communication device includes a wireless communication unit for determining a location using received information, a controller for generating location information based on the determined location and searching for an application corresponding to the location information, and a display for displaying an indicator of the searched application.

17 Claims, 23 Drawing Sheets

FIG. 9

| Location information | Application | Speed | Distance |
|---|---|---|---|
| Home | Broadcast service | X | Within 1km |
|  | Remote controller | X | X |
| Company | Schedule management | X | Within 1km |
|  | Electronic dictionary | X | X |
| Library | Electronic dictionary | X | Within 1km |
| Department store | MP3 | Exceeding 1km/h | X |
|  | Wireless Internet | X | Within 1km |
| Park | Camera | X | Within 1km |
|  | MP3 | Exceeding 5km/h | X |
| Subway | Broadcast service | X | X |
|  | Game | X | X |
|  | MP3 | X | X |
|  | Subway linemap | X | Within 1km |
| Road | MP3 | Exceeding 10km/h | X |
|  | Navigation | Exceeding 30km/h | X |
| School | Broadcast service | X | X |
|  | Electronic dictionary | X | Within 1km |

911 — Home
912 — Company
913 — Library
914 — Department store
915 — Park
916 — Subway
917 — Road
918 — School

FIG. 17

| Location information | State setting information | Detail | Speed | Distance |
|---|---|---|---|---|
| Home | Background image setting | Second image | × | Within 1km |
|  | Network access | First IP | × | × |
| Company | Background image setting | Third image | × | Within 1km |
|  | Network access | Second IP | × | Within 1km |
|  | Announcing mode setting | Vibration mode | × | Within 1km |
| Department store | Announcing mode setting | Vibration mode | × | × |
| Subway | Announcing mode setting | Vibration mode | × | × |
|  | MP3 play list setting | List information | × | Within 1km |
| Road | Announcing mode setting | Bell sound mode | × | × |
| School | Background image setting | First image | × | Within 1km |
|  | Announcing mode setting | Lamp mode | × | Within 1km |

1711 — Home
1712 — Company
1713 — Department store
1714 — Subway
1715 — Road
1716 — School

FIG. 18

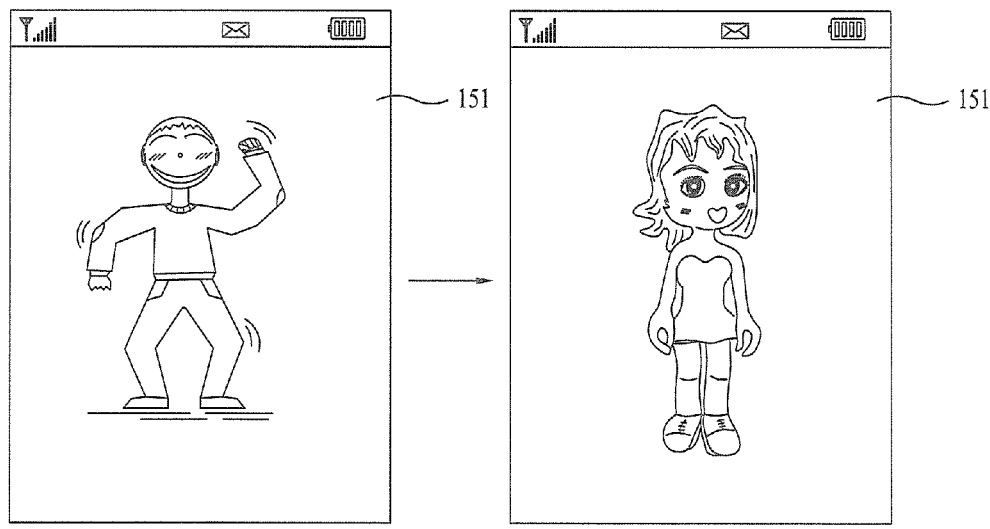

COMMUNICATION DEVICE AND METHOD OF CONTROLLING OPERATION OF COMMUNICATION DEVICE

CROSS-REFERENCE TO RELATED APPLICATIONS

Pursuant to 35 U.S.C. §119(a), this application claims the benefit of earlier filing date and right of priority to Korean Application No. 10-2007-0133493, filed on Dec. 18, 2007, the contents of which is incorporated by reference herein in its entirety.

FIELD OF THE INVENTION

The present invention is directed to a communication device, and more particularly, to a method of controlling an operation of a communication device. Although the present invention is suitable for a wide scope of applications, it is particularly suitable for a communication device provided with a location measuring function.

DESCRIPTION OF THE RELATED ART

A communication device may be configured to perform various functions. Examples of communication device functions include data and voice communications, capturing images and video via a camera, recording audio, playing music files via a speaker system, and displaying images and video on a display. Some terminals also support game playing, while other terminals are configured as multimedia players. Recently, communication devices have been configured to receive broadcast and multicast signals to permit viewing of content such as videos and television programs.

Efforts are ongoing to support and increase the functionality of communication devices. These efforts include software and hardware improvements, as well as changes and improvements in the structural components that form communication devices. As a result, a user is able to easily execute a specific one of a plurality of applications using a communication device.

However, conventional communication devices do not provide any method for allowing a user to select an application according to location information. Therefore, the user must inconveniently enter a menu mode one-by-one in order to select a specific application at a specific location.

SUMMARY OF THE INVENTION

In one aspect of the present invention, a communication device is provided. The communication device includes a wireless communication unit for determining location using received information, a controller for generating location information according to the determined location and searching for an application corresponding to the location information, and a display for displaying an indicator of the searched application.

It is contemplated that the controller specifies at least one application according to the location information. It is further contemplated that, the controller stops displaying an indicator of a previously searched application and displays an indicator of the at least one specified application if the previously searched application no longer corresponds to the location information.

It is contemplated that the communication device includes a user input unit for selecting the displayed indicator and wherein the controller executes the application corresponding to the selected indicator. It is further contemplated that the controller searches for state setting information corresponding to the location information and changes a state according to the searched state setting information.

It is contemplated that the state setting information includes setting information related to at least one of a background image, an announcing mode or a network change. It is further contemplated that the wireless communication unit transmits an operation control signal to an external device according to the searched state setting information.

In another aspect of the present invention, a method of controlling an operation in a communication device is provided. The method includes determining a location using received information, generating location information according to the determined location, searching for an application corresponding to the location information, and displaying an indicator of the searched application.

It is contemplated that displaying the searched application includes specifying at least one application according to the location information. It is further contemplated that displaying the searched application further includes no longer displaying an indicator of a previously searched application and displaying an indicator of the at least one specified application if the previously searched application no longer corresponds to the location information.

It is contemplated that the method further includes receiving a user input unit for selecting the displayed indicator and executing the application corresponding to the selected indicator. It is further contemplated that the method further includes searching for state setting information corresponding to the location information and changing a state of the communication device according to the searched state setting information.

It is contemplated that the state setting information includes setting information related to at least one of a background image, an announcing mode or a network change. It is further contemplated that the method further includes transmitting an operation control signal to an external device according to the searched state setting information.

In another aspect of the present invention, a method of controlling an operation in a communication device is provided. The method includes determining a location using received information, generating location information based on the determined location, searching for state setting information corresponding to the location information, and changing a state of the communication device according to the searched state setting information.

It is contemplated that the state setting information includes setting information related to at least one of a background image, an announcing mode or a network change. It is further contemplated that the method further includes transmitting an operation control signal to an external device according to the searched state setting information.

It is contemplated that the method further includes searching for an application corresponding to the location information, and displaying an indicator of the searched application. It is further contemplated that displaying the searched application includes specifying at least one application according to the location information and no longer displaying an indicator of a previously searched application and displaying an indicator of the at least one specified application if the previously searched application no longer corresponds to the location information. Preferably, the method further includes receiving a user input unit for selecting the displayed indicator and executing the application corresponding to the selected indicator.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIG. 9 illustrates a map table of an application specified according to location information according to an embodiment of the present invention.

FIG. 17 illustrates a map table of state setting information specified according to location information according to an embodiment the present invention.

FIG. 18 illustrates a screen of a process for changing a state in accordance with changed state setting information in a communication device according to an embodiment of the present invention when the state setting information specified according to location information is changed due to a new location.

DETAILED DESCRIPTION OF THE PREFERRED EMBODIMENTS

Reference will be made in detail to the preferred embodiments of the present invention, examples of which are illustrated in the accompanying drawings. It is to be understood by those of ordinary skill in this technological field that other embodiments may be utilized, and structural, electrical, as well as procedural changes may be made without departing from the scope of the present invention. Wherever possible, the same reference numbers are used throughout the drawings to refer to the same or similar parts.

Figure 1:
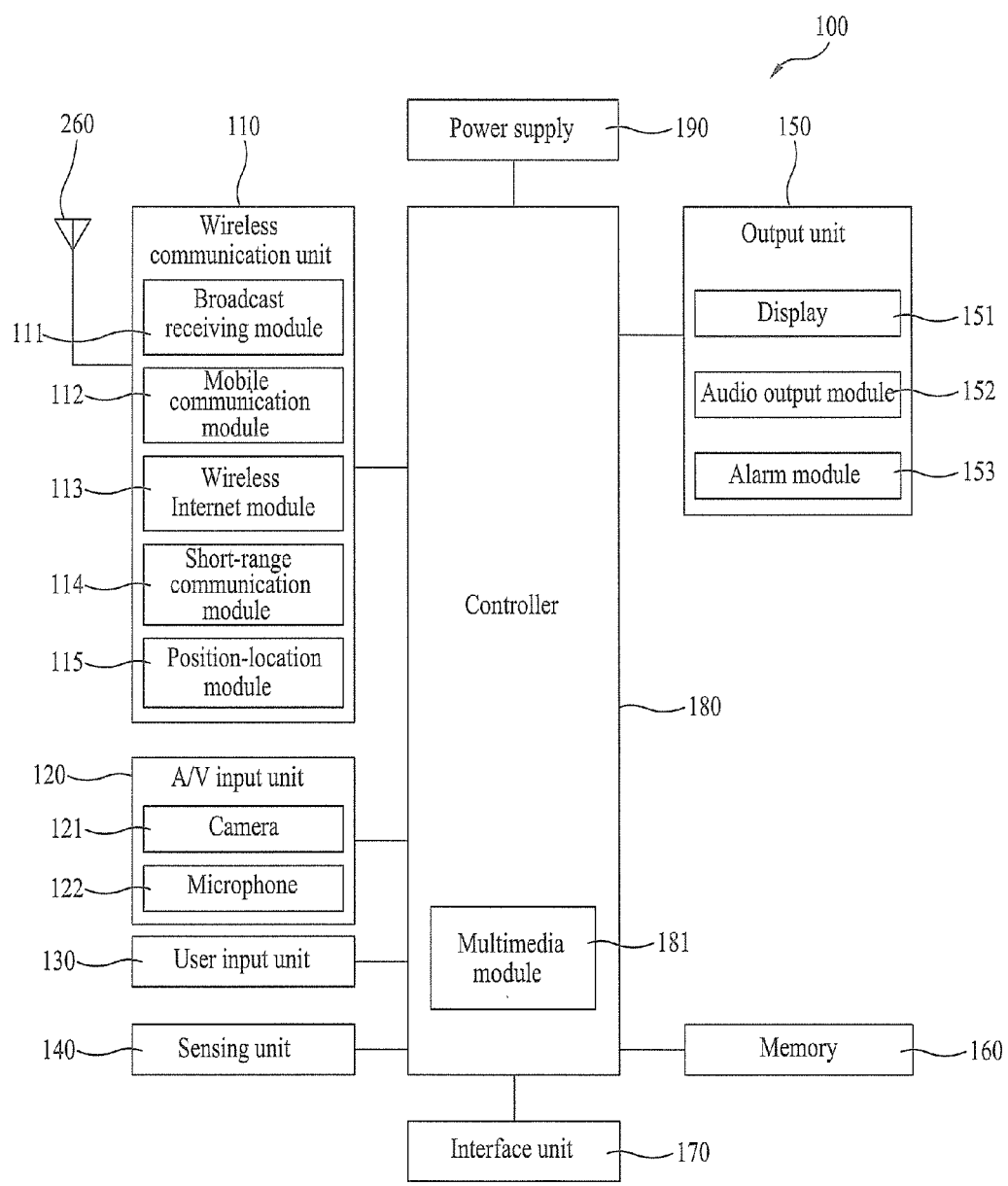
FIG. 1 illustrates a block diagram of a communication device in accordance with an embodiment of the present invention.

FIG. 1 is a block diagram of communication device 100 in accordance with an embodiment of the present invention. The communication device 100 may be implemented using a variety of different types of terminals. Examples of such terminals include mobile phones, user equipment, smart phones, computers, digital broadcast terminals, personal digital assistants, portable multimedia players (PMP) and navigators.

By way of non-limiting example only, the present invention will be described with regard to a communication device. However, the present invention may be applied to other types of terminals.

FIG. 1 illustrates the communication device 100 having various components. However, it is understood that implementing all of the illustrated components is not a requirement. Greater or fewer components may alternatively be implemented.

FIG. 1 illustrates a wireless communication unit 110 configured with commonly implemented components. For example, the wireless communication unit 110 typically includes one or more components that permit wireless communication between the communication device 100 and a wireless communication system or network within which the communication device is located.

The broadcast receiving module 111 receives a broadcast signal and/or broadcast associated information from an external broadcast managing entity via a broadcast channel. The broadcast channel may include a satellite channel and a terrestrial channel. The broadcast managing entity refers generally to a system that transmits a broadcast signal and/or broadcast associated information.

Examples of broadcast associated information include information associated with a broadcast channel, a broadcast program and a broadcast service provider. For example, broadcast associated information may include an electronic program guide (EPG) of digital multimedia broadcasting (DMB) and electronic service guide (ESG) of digital video broadcast-handheld (DVB-H).

The broadcast signal may be implemented as a TV broadcast signal, a radio broadcast signal, or a data broadcast signal. The broadcast signal may further include a broadcast signal combined with a TV or radio broadcast signal.

The broadcast receiving module 111 may be configured to receive broadcast signals transmitted from various types of broadcast systems. By non-limiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T).

Receiving multicast signals is also possible. Data received by the broadcast receiving module 111 may be stored in a suitable device, such as the memory 160.

The mobile communication module 112 transmits/receives wireless signals to/from one or more network entities, such as a base station or Node-B. The signals may represent audio, video, multimedia, control signaling, or data.

The wireless Internet module 113 supports Internet access for the communication device 100. The wireless Internet module 113 may be internally or externally coupled to the terminal.

The short-range communication module 114 facilitates relatively short-range communications. Suitable technologies for implementing the short-range module 114 include radio frequency identification (RFID), infrared data association (IrDA), ultra-wideband (UWB), as well at the networking technologies commonly referred to as Bluetooth® and ZigBee®.

The position-location module 115 identifies or otherwise determines the location of the communication device 100. The position-location module 115 may be implemented using global positioning system (GPS) components that cooperate with associated satellites, network components, and combinations thereof.

The audio/video (A/V) input unit 120 is configured to provide audio or video signal inputs to the communication device 100. As illustrated, the A/V input unit 120 includes a camera 121 and a microphone 122. Two or more microphones 122 and/or cameras 121 may be included.

The camera 121 receives and processes image frames of still pictures or video. The microphone 122 receives an external audio signal while the communication device 100 is in a specific mode, such as phone call mode, recording mode or voice recognition mode. This audio signal is processed and converted into digital data.

The communication device 100, and specifically the A/V input unit 120, typically includes assorted noise removing algorithms to remove noise generated in the course of receiving the external audio signal. Data generated by the A/V input unit 120 may be stored in the memory 160, utilized by output unit 150, or transmitted via one or more modules of the communication unit 110.

The user input unit 130 generates input data in response to user manipulation of an associated input device or devices. The input devices may include a keypad, a dome switch, a jog wheel, a jog switch or a touchpad utilizing static pressure or capacitance. A specific example of the user input unit 130 configured as a touchpad in cooperation with a touch screen display will be described in more detail.

The sensing unit 140 provides status measurements related to various aspects of the communication device 100. For example, the sensing unit 140 may detect an open/close status of the communication device 100, a position change of the communication device or component of the communication device, a presence or absence of user contact with the communication device, orientation of the communication device, acceleration or deceleration of the communication device, or relative positioning of components of the communication device, such as a display or keypad.

The sensing unit 140 in a communication device 100 configured as a slide-type communication device may sense whether a sliding portion of the communication device is open or closed. The sensing unit 140 may also sense the presence or absence of power provided by the power supply 190 or the presence or absence of a coupling or other connection between the interface unit 170 and an external device.

The interface unit 170 is often implemented to couple the communication device 100 with external devices. Typical external devices include wired/wireless headphones, external chargers, power supplies, earphones, microphones, and storage devices configured to store data such as audio, video, or pictures. The interface unit 170 may be configured using a wired/wireless data port, audio input/output ports, video input/output ports or a card socket for coupling to a memory card, subscriber identity module (SIM) card, user identity module (UIM) card, or removable user identity module (RUIM) card.

The output unit 150 generally includes various components that support the output requirements of the communication device 100. The display 151 is typically implemented to visually display information associated with the communication device 100.

For example, the display 151 will generally provide a user interface or graphical user interface that includes information associated with placing, conducting, and terminating a phone call if the communication device is operating in a phone call mode. As another example, the display 151 may additionally or alternatively display images associated with a video call mode or a photographing mode of the communication device 100.

The display 151 may be configured as a touch screen working in cooperation with an input device, such as a touchpad, in one embodiment. This configuration permits the display 151 to function both as an output device and an input device.

The display 151 may be implemented using known display technologies including a liquid crystal display (LCD), a thin film transistor-liquid crystal display (TFT-LCD), an organic light-emitting diode display (OLED), a flexible display or a three-dimensional display. The communication device 100 may include one or more of displays 151. An example of a two-display embodiment is one display 151 configured as an internal display viewable when the communication device 100 is in an open position and a second display configured as an external display viewable in both the open and closed positions.

FIG. 1 further illustrates the output unit 150 having an audio output module 152 that supports the audio output requirements of the communication device 100. The audio output module 152 may be implemented using one or more speakers, buzzers, other audio producing devices, or combinations thereof.

The audio output module 152 functions in various modes such as a call-receiving mode, a call-placing mode, a recording mode, a voice recognition mode or a broadcast reception mode. The audio output module 152 outputs audio related to a particular function during operation of the communication device 100, such as call received, message received, or errors.

The output unit 150 is further illustrated having an alarm module 153, which is commonly used to signal or otherwise identify the occurrence of a particular event associated with the communication device 100. Typical events include call received, message received and user input received.

Examples of outputs of the alarm module 153 include tactile sensations to a user such as vibration. For example, the alarm module 153 may be configured to vibrate when the communication device 100 receives a call or message or receives a user input in order to provide a tactile feedback mechanism. It is understood that the various outputs provided by the components of the output unit 150 may be separately performed or the outputs may be performed using any combination of the components.

The memory 160 is generally used to store various types of data to support the processing, control, and storage requirements of the communication device 100. Examples of data stored in the memory 160 include program instructions for applications operating on the communication device 100, contact data, phonebook data, messages, pictures, and video.

The memory 160 may be implemented using any type or combination of suitable volatile and non-volatile memory or storage devices. Examples of such devices include random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, and other similar memory or data storage devices.

The controller 180 typically controls the overall operations of the communication device 100. For example, the controller 180 performs control and processing associated with voice calls, data communications, video calls, camera operations and recording operations.

The controller 180 may include a multimedia module 181 that provides multimedia playback. The multimedia module 181 may be configured as part of the controller 180 or implemented as a separate component.

The power supply 190 provides power required by the various components of the communication device 100. The power provided may be internal power, external power, or combinations thereof.

Various embodiments described herein may be implemented in a computer-readable medium. The computer-readable medium may utilize computer software, hardware, or some combination thereof.

The embodiments described herein may be implemented in a hardware implementation within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Controller 180 may implement the embodiments.

The embodiments described herein may be implemented in a software implementation with separate software modules, such as procedures and functions, each of which perform one or more of the functions and operations described herein. The software codes can be implemented with a software application written in any suitable programming language that is stored in the memory 160 and executed by the controller 180.

The communication device 100 may be implemented in a variety of different configurations. Examples of such configurations include folder-type, slide-type, bar-type, rotational-type, swing-type and combinations thereof.

For clarity, the disclosure of the present invention will primarily relate to a slide-type communication device 100. However such teachings apply equally to other types of terminals.

Figure 2:
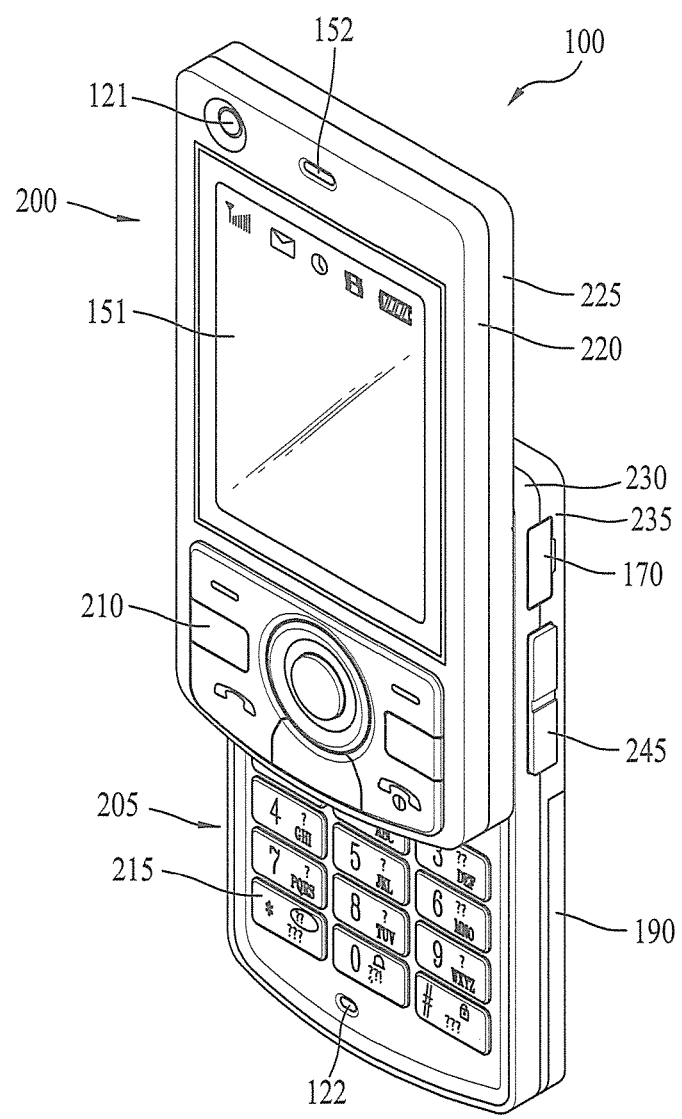
FIG. 2 illustrates a perspective view of a front side of a communication device according to an embodiment of the present invention.

FIG. 2 is a perspective view of a front side of a communication device according to an embodiment of the present invention. As illustrated in FIG. 2, the communication device 100 includes a first body 200 configured to slideably move relative to a second body 205.

The user input unit 130 is implemented using function keys 210 and a keypad 215. The function keys 210 are associated with first body 200 and the keypad 215 is located on second body 205. The keypad 215 includes various keys, such as numbers, characters, and symbols, to enable a user to place a call, prepare a text or multimedia message, and otherwise operate the communication device 100.

The first body 200 slides relative to second body 205 between open and closed positions of the communication device 100. The first body 200 is positioned over the second body 205 in a closed position such that the keypad 215 is substantially or completely covered by the first body. User access to the keypad 215, the display 151 and the function keys 210 is facilitated in the open position. The function keys 210 provide a convenient means for a user to enter commands, such as 'start', 'stop' and 'scroll'.

The communication device 100 may operate in a standby mode to receive a call or message or receive and respond to network control signaling, or in an active call mode. The communication device 100 typically operates in the standby mode when in the closed position and operates in the active mode when in the open position. However, the mode configuration may be changed as required or desired.

The first body 200 is illustrated as formed from a first case 220 and a second case 225. The second body 205 is illustrated as formed from a first case 230 and a second case 235. The first cases 220, 230 and second cases 225, 235 are typically formed from a suitably rigid material, such as injection molded plastic, or formed using metallic material, such as stainless steel (STS) and titanium (Ti).

One or more intermediate cases may be provided between the first cases 220, 230 and second cases 225, 235 of one or both of the first 200 and second 205 bodies. The first body 200 and second body 205 are typically sized to receive electronic components necessary to support operation of the communication device 100.

The first body 200 is illustrated as having a camera 121 and audio output module 152 configured as a speaker positioned relative to the display 151. The camera 121 may be constructed such that it can be selectively positioned relative to first body 200 by being rotated or swiveled.

The function keys 210 are positioned adjacent to a lower side of the display 151. The display 151 is illustrated as an LCD or OLED, but may also be configured as a touch screen having an underlying touchpad to generate signals in response to user contact with the touch screen, such as with a finger or stylus.

The second body 205 has a microphone 122 positioned adjacent to the keypad 215 and side keys 245 positioned along the side of second body, which function as a user input unit 130. Preferably, the side keys 245 are configured as hot keys, such that the side keys are associated with a particular function of the communication device 100.

An interface unit 170 is positioned adjacent to the side keys 245. A power supply 190 in the form of a battery is located on a lower portion of the second body 205.

Figure 3:
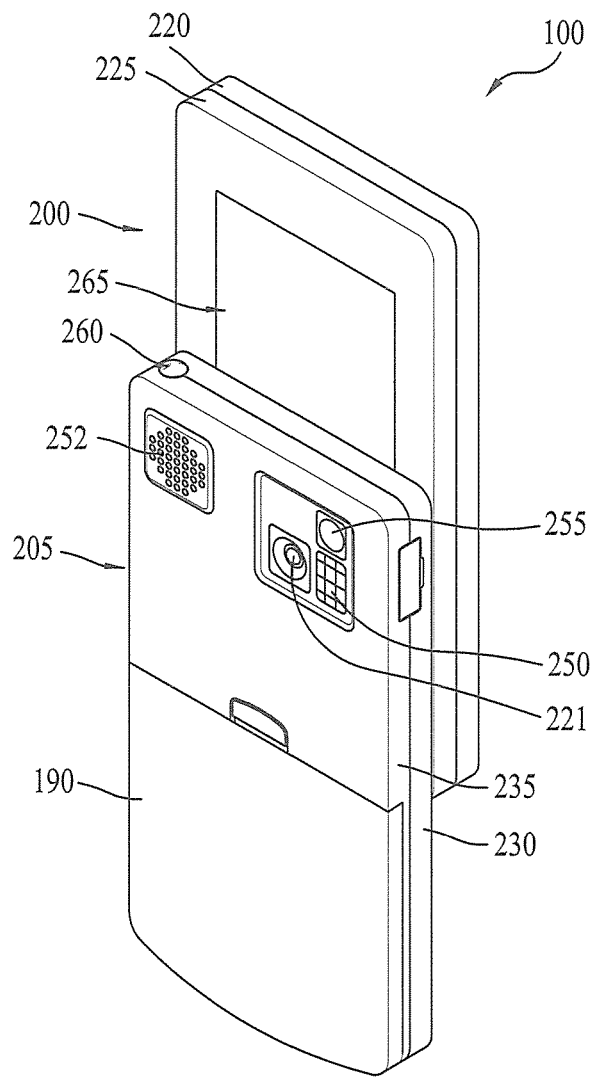
FIG. 3 illustrates a rear view of the communication device illustrated in FIG. 2.

FIG. 3 is a rear view of the communication device 100 illustrated in FIG. 2. FIG. 3 illustrates a camera 221 with an associated flash 250 and mirror 255 located on the second body 205.

The flash operates in conjunction with the camera 221. The mirror 255 facilitates a user positioning the camera 221 in a self-portrait mode. The camera 221 faces a direction that is opposite to a direction faced by the camera 121 of the first body 200 illustrated in FIG. 2. Each of the cameras 121, 221 may have the same or different capabilities.

The camera 121 of the first body 200 may have a relatively lower resolution than the camera 221 of the second body 205 in one embodiment. This configuration works well during a videoconference, for example, in which reverse link bandwidth capabilities may be limited. The relatively higher resolution of the camera 221 of the second body 205 facilitates higher quality pictures for later use or for communicating with others.

The second body 205 also includes an audio output module 252 configured as a speaker and located on an upper side of the second body 205. The audio output modules 152, 252 of the first and second bodies 200, 205, may cooperate to provide stereo output. Furthermore, either or both of the audio output modules 152, 252 may be configured to operate as a speakerphone.

A broadcast signal receiving antenna 260 is located at an upper end of the second body 205. The antenna 260 functions in cooperation with the broadcast receiving module 111. The antenna 260 may be fixed or configured to retract into the second body 205.

The rear side of the first body 200 includes a slide module 265. The slide module 265 slideably couples with a corresponding slide module (not shown) located on the front side of the second body 205.

It is understood that the illustrated arrangement of the various components of the first and second bodies 200, 205, may be modified as required or desired. For example, some or all of the components illustrated on the second body 205 may alternatively be implemented on the first body 200 and vise-versa. Furthermore, the location and relative positioning of the components is not critical to many embodiments and, therefore, the components may be positioned at locations that differ from those illustrated in the FIGS. 2 and 3.

The communication device 100 illustrated in FIGS. 1-3 may be configured to operate within a communication system that transmits data via frames or packets, such as wireless communication systems, wireline communication systems, and satellite-based communication systems. The various communication systems utilize different air interfaces and/or physical layers.

Examples of air interfaces utilized by the various communication systems include frequency division multiple access (FDMA), time division multiple access (TDMA), code division multiple access (CDMA), universal mobile telecommunications system (UMTS), long term evolution (LTE) of the UMTS, and the global system for mobile communications (GSM). Further description of the present invention will be with respect to a CDMA communication system. However, such teachings apply equally to other types of systems.

Figure 4:
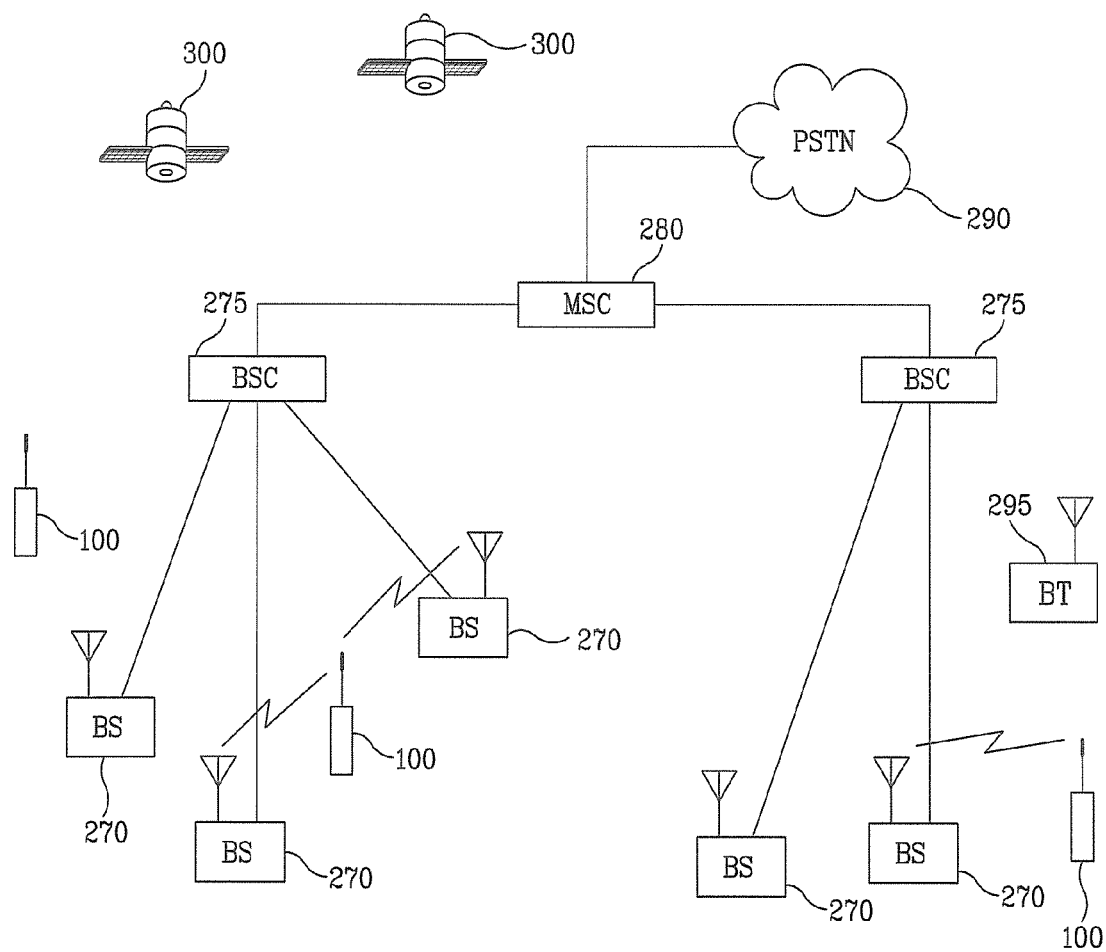
FIG. 4 illustrates a block diagram of a CDMA wireless communication system operable with the communication device illustrated in FIGS. 1-3.

FIG. 4 illustrates a CDMA wireless communication system. As illustrated in FIG. 4, the system includes a plurality of communication devices 100, a plurality of base stations 270, a base station controllers (BSCs) 275, and a mobile switching center (MSC) 280.

The MSC 280 interfaces with a conventional public switch telephone network (PSTN) 290. The MSC 280 is also interfaces with the BSCs 275.

The BSCs 275 are coupled to the base stations 270 via backhaul lines. The backhaul lines may be configured in accordance with any of several known interfaces, such as E1/T1, ATM, IP, PPP, Frame Relay, HDSL, ADSL, or xDSL. The system may also include more than two BSCs 275.

Each base station 270 may include one or more sectors, each sector having an omni-directional antenna or an antenna pointed in a particular direction radially away from the base station. Alternatively, each sector may include two antennas for diversity reception. Each base station 270 may be configured to support a plurality of frequency assignments, each having a particular spectrum, such as 1.25 MHz or 5 MHz.

The intersection of a sector and frequency assignment may be referred to as a CDMA channel. The base stations 270 may also be referred to as base station transceiver subsystems (BTSs).

The term "base station" may be used to refer collectively to a BSC 275 and one or more base stations 270. The base stations may also be denoted as "cell sites." Alternatively, individual sectors of a given base station 270 may be referred to as cell sites.

A broadcasting transmitter 295 broadcasts to communication devices 100 operating within the system. The broadcast receiving module 111 of the communication devices 100 is typically configured to receive broadcast signals transmitted by the broadcasting transmitter 295. Similar arrangements may be implemented for other types of broadcast and multicast signaling as previously discussed.

FIG. 4 further depicts several global positioning system (GPS) satellites 300. The satellites 300 facilitate locating the position of some or all of the communication devices 100.

Although two satellites 300 are illustrated, it is understood that useful positioning information may be obtained with greater or fewer satellites. The position-location module 115 is typically configured to cooperate with the satellites 300 in order to obtain desired position information. It is contemplated that other types of position detection technology, such as location technology that may be used in addition to or instead of GPS location technology, may alternatively be implemented. Some or all of the GPS satellites 300 may alternatively or additionally be configured to provide satellite DMB transmissions.

The base stations 270 receive sets of reverse-link signals from various communication devices 100 during typical operation of the wireless communication system. The communication devices 100 are engaged in calls, messaging, and other communications.

Each reverse-link signal received by a given base station 270 is processed within the same base station. The resulting data is forwarded to an associated BSC 275.

The BSCs 275 provide call resource allocation and mobility management functionality including the orchestration of soft handoffs between base stations 270. The BSCs 275 also route the received data to the MSC 280, which provides additional routing services for interfacing with the PSTN 290. The PSTN interfaces with the MSC 280 and the MSC interfaces with the BSCs 275, which in turn control the base stations 270 to transmit sets of forward-link signals to the communication devices 100.

As used herein, 'location information' refers to location relevant information generated based on a location of a communication device 100. For example, location information can include at least one of administrative address information, POI (point of interest) information, setup name information and relative location information. The location information may also refer to the coordinate information itself.

The administrative address information can hierarchically include a broad-classification area. Examples of broad-classification areas are a country, a first middle-classification area such as a state, special city, or metropolitan city, a second middle-classification area such as city or county, a first narrow-classification area, or a second narrow-classification area.

For example, the administrative address information can be selectively generated from a group ranging from the broad-classification area to the narrow-classification area. This facilitates pre-storing the coordinate information according to the administrative address information in the memory 160 or receiving the coordinate information according to the administrative address information from outside via the wireless communication unit 110.

The POI information refers to name or special item information that is set for a specific place. For example, the POI information can include a name such as 'xx mart', 'xx restaurant', or 'xx department store' or special item information such as 'Gyunggi-Do restaurant for good taste', 'Recommended date place', or 'Weekend visit place'. The coordinate information according to the POI information may be pre-stored in the memory 160 or received from outside via the wireless communication unit 110.

The setup name information refers to a name or special item information set up for a specific place by a user. For example, the setup name information can include 'yesterday meeting place', 'first data place', 'restaurant for good taste', 'company', 'house', or 'school'. The coordinate information according to the setup name information is pre-stored in the memory 160 or received from outside via the wireless communication unit 110.

The relative location information refers to information based on a pattern moving between one point and another point as a moving distance, a moving time, a moving speed, or a moving direction. The relative location information may also refer to information based on a relative location with reference to a distance to a specific point, such as a location of a specific communication device 100, a moving speed, or a moving direction. The coordinate information of a specific point is pre-stored in the memory 160 or received from outside via the wireless communication unit 110.

Figure 5:
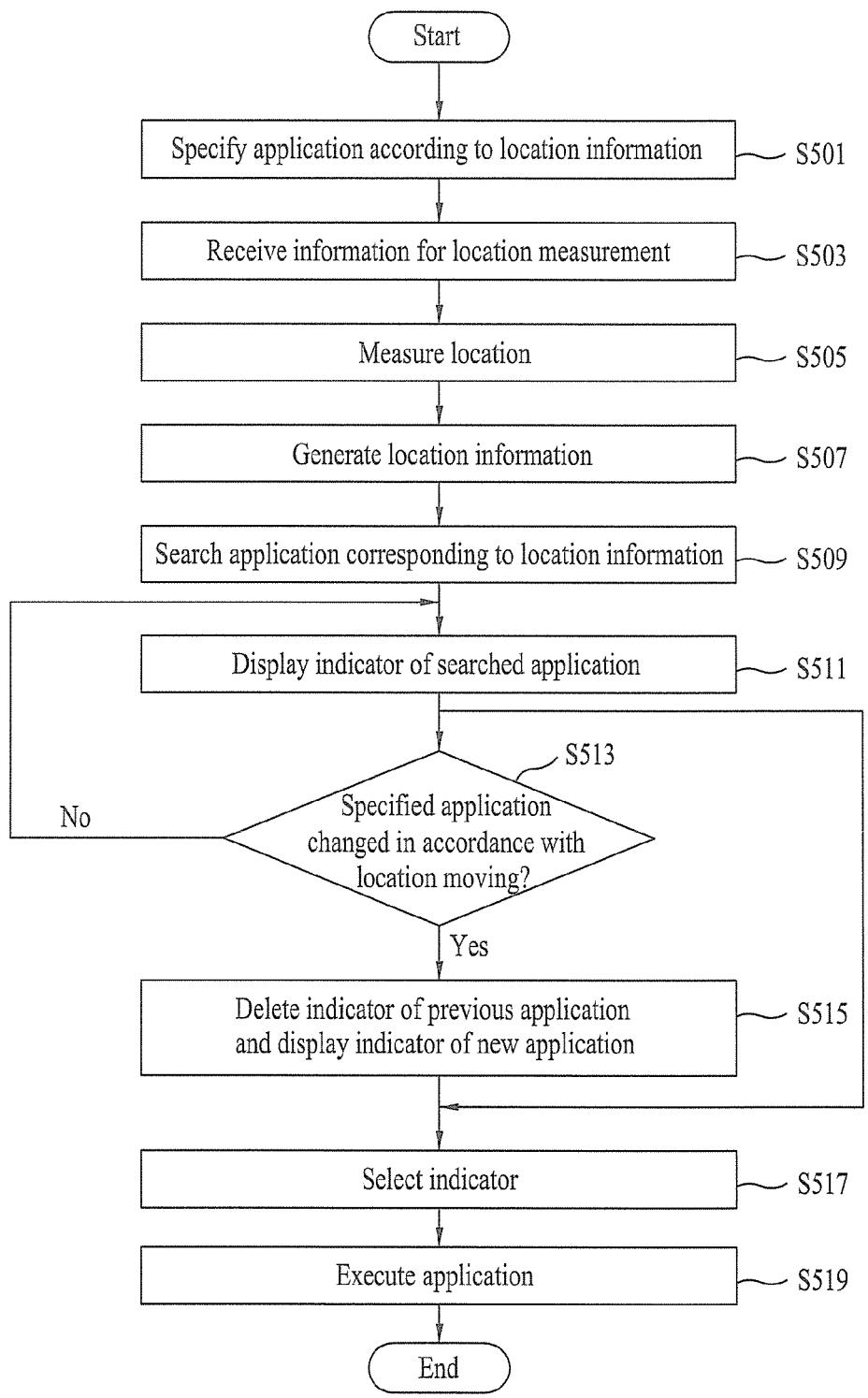
FIG. 5 illustrates a flowchart of a first method of controlling an operation in a communication device according to the present invention.

A method for controlling on operation in a communication device according to the present invention is explained with reference to FIG. 5. FIG. 5 is a flowchart for a first method of controlling an operation in a communication device 100. For clarity and convenience of explanation, it is assumed that the communication device 100 includes at least one of the elements illustrated in FIG. 1.

As illustrated in FIG. 5, the communication device 100 specifies at least one application (S501). Location information that is a specified target of an application is directly input by a user via the user input unit 130 or can be selected from location information previously stored in the memory 160 by a user.

A process for setting location information as a specified target of an application is explained in detail with reference to FIGS. 6A to 6D. FIGS. 6A to 6D illustrate a screen of a process for setting location information in a communication device 100 according to one embodiment of the present invention.

Figure 6A:
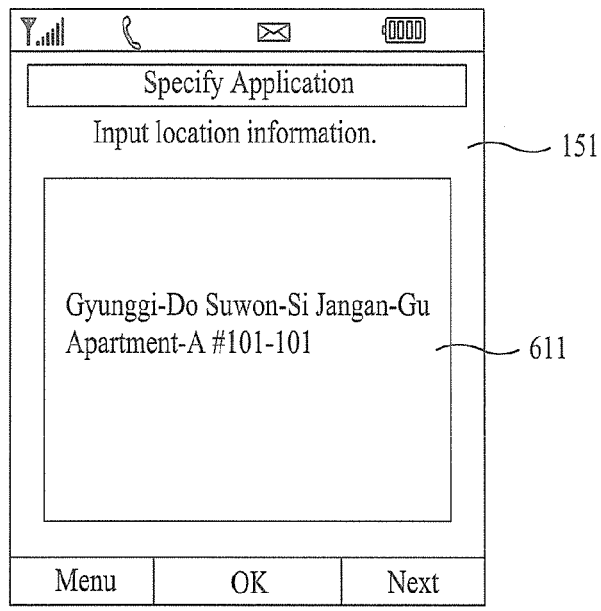
FIGS. 6A to 6D illustrate a screen of a process for setting location information in a communication device according to an embodiment of the present invention.

As illustrated in FIG. 6A, a user is able to directly input administrative address information 611 to the communication device 100 via the user input unit 130 as a specified target of an application. Coordinate information of the administrative address information 611 may be pre-stored in the memory 160.

Figure 6B:
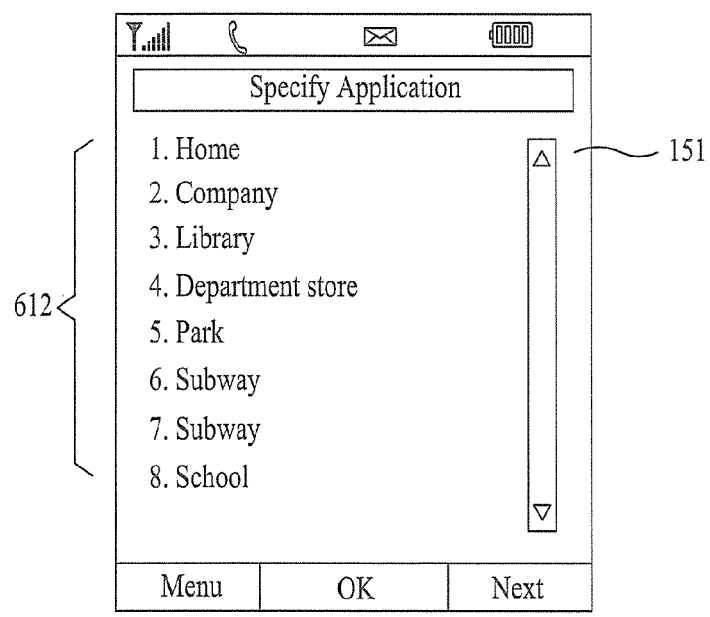

As illustrated in FIG. 6B, the communication device 100 displays a list 612 of POI information or setup name information for which coordinate information or administrative address information are pre-stored in the memory 160. Therefore, a user is able to select location information that is a specified target of the application, from the list 612.

Figure 6C:
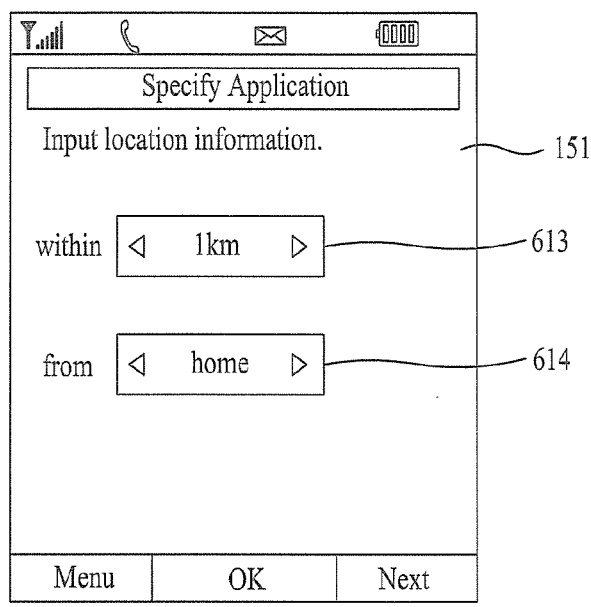
Figure 6D:
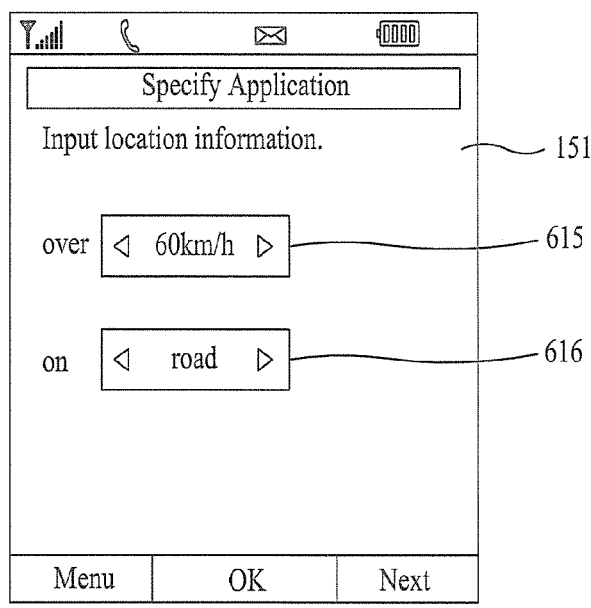

As illustrated in FIG. 6C, relative location information with reference to a specific place, such as 'within 1 km from home', can be input to the communication device 100 via the user input unit 130. As illustrated in FIG. 6D, relative location information in a specific place, 'over 60 km/h on road', can be input to the communication device 100 via the user input unit 130.

A user can freely set the specific place and the relative location information illustrated in FIG. 6C and FIG. 6D. Coordinate information or administrative address information related to the specific place may be pre-stored in the memory 160 when the specific place is POI information or setup name information.

Figure 7A:
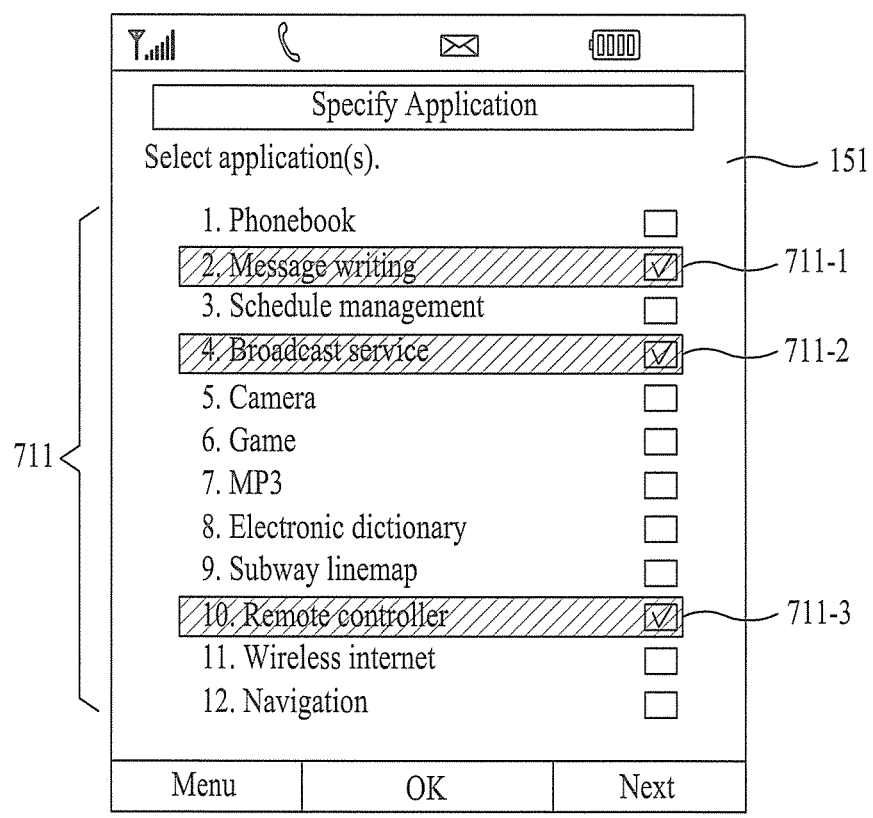
FIGS. 7A to 7C illustrate a screen of a process for specifying an application according to location information in a communication device according to an embodiment of the present invention.
Figure 7B:
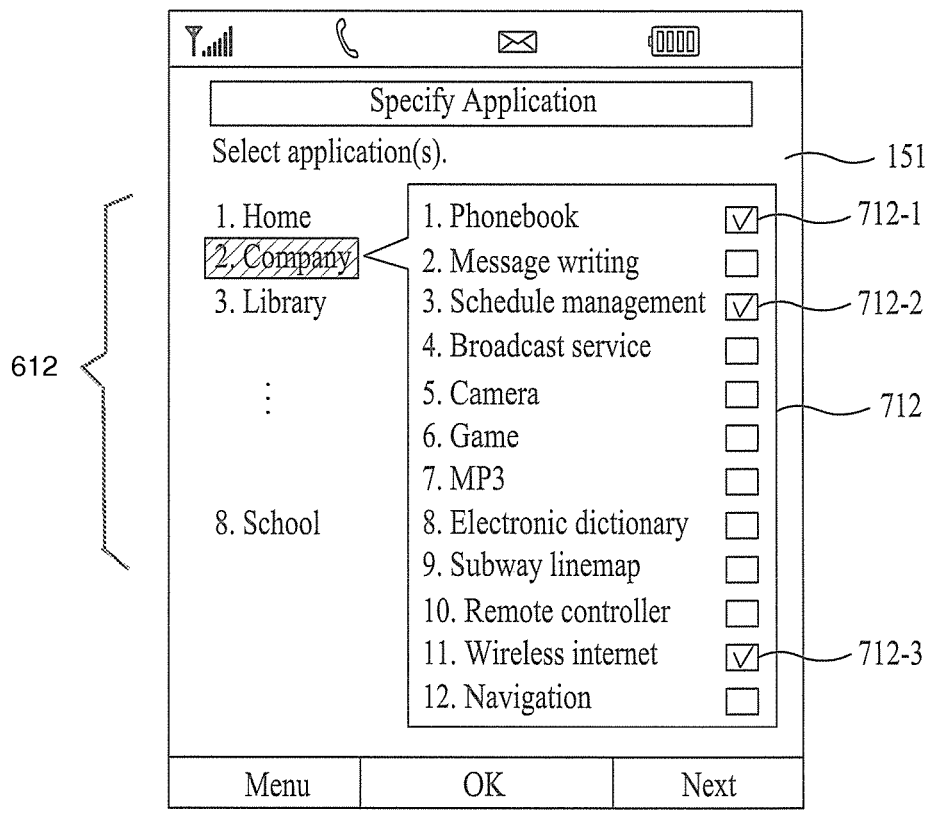
Figure 7C:
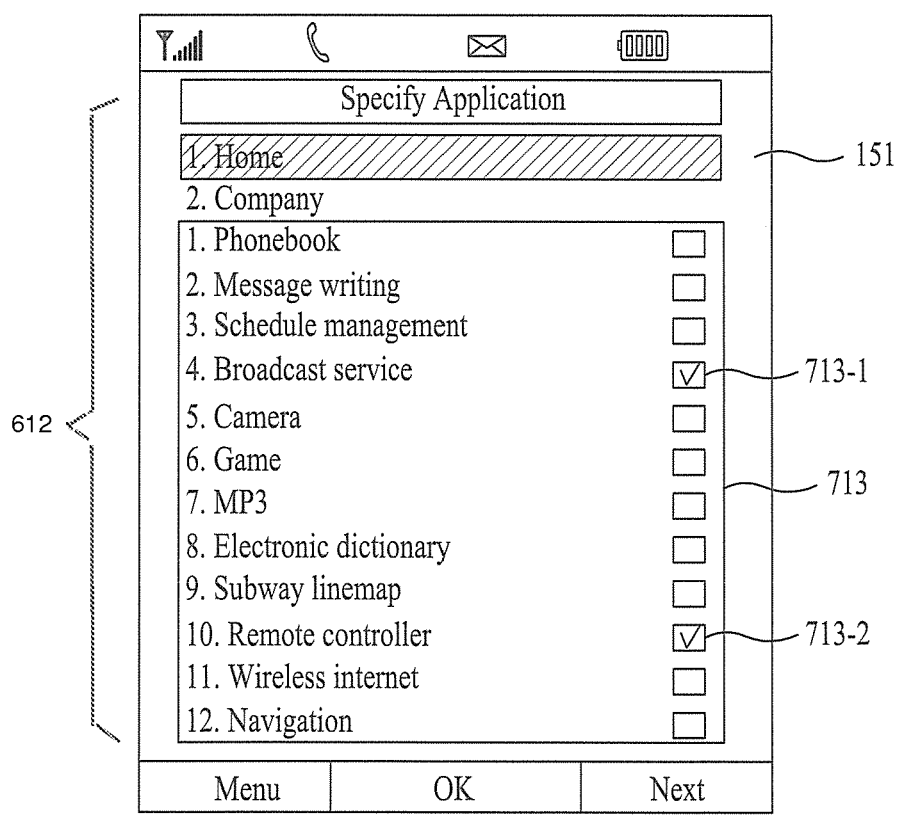

A process for specifying an application according to information is explained in detail with reference to FIGS. 7A to 7C. FIGS. 7A to 7C illustrate a screen for a process for specifying an application according to location information in a communication device 100 according to one embodiment of the present invention.

As illustrated in FIG. 7A, the communication device 100 displays a list 711 of applications that will be preset to correspond to location information when a specific key, such as an application specifying command key, is selected after setting location information. For example, the communication device 100 may specify 'Message writing' 711-1, 'Broadcast service' 711-2 and 'Remote controller' 711-3 to correspond to a preset location information, such as 'Gyunggi-Do Suwon-Si Jangan-Gu Yuljeon-Dong Apartment-A #101-101' in response to a selection made by a user.

As illustrated in FIG. 7B, the communication device 100 displays a list 712 of applications as a word balloon that will be specified to correspond to the selected location information when a specific location information, such as 'company', is selected from a location information list 612. For example, the communication device 100 may specify 'Phonebook' 712-1, 'Schedule management' 712-2 and 'Wireless internet' 712-3 to correspond to 'company' selected from the location information list 612 in response to a selection made by a user. The list 712 is displayed using a screen division such as PIP (picture in picture), POP (picture out picture), or picture by picture (PBP).

As illustrated in FIG. 7C, the communication device 100 displays a list 713 as a popup window of applications that will be specified to correspond to the selected location information when specific information, such as 'home', is selected from the location information list 612. For example, the communication device 100 may specify 'Broadcast service' 713-1 and 'Remote controller' 713-2 to correspond to 'home' selected from the location information list 612 in response to a selection made by a user. The application list 713 is displayed using a screen division system such as PIP, POP, or PBP.

A process for specifying an application according to location information for an application operation in the communication device 100 is explained in detail with reference to FIGS. 8A to 8D. FIGS. 8A to 8D illustrate a screen of a process for specifying an application according to location information in a communication device 100 for an application operation according to one embodiment of the present invention.

Figure 8A:
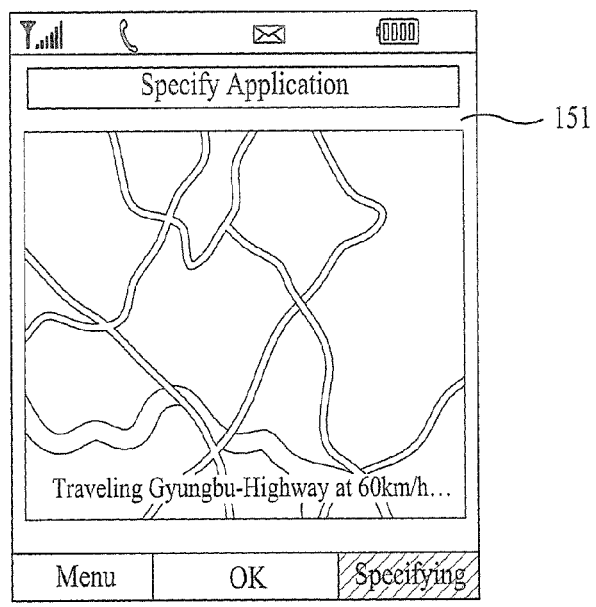
FIGS. 8A to 8D illustrate a screen of a process for specifying an application according to location information in a communication device according to an embodiment of the present invention.
Figure 8B:
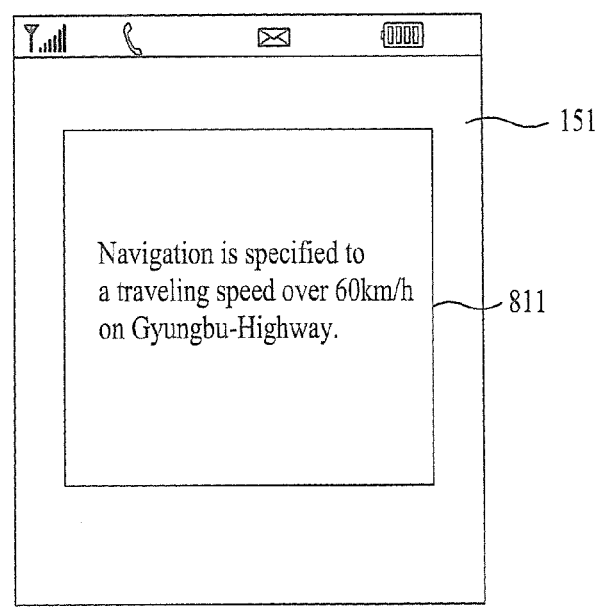

As illustrated in FIG. 8A and FIG. 8B, the communication device 100 may specify a navigation speed exceeding a current traveling speed at a currently located place if the 'Specifying' area is activated while executing a navigation function. For example, the communication device 100 may specify a navigation speed over 60 km/h on Gyungbu-Highway if 'Specifying' is activated while traveling Gyungbu-Highway at 60 km/h.

Figure 8C:
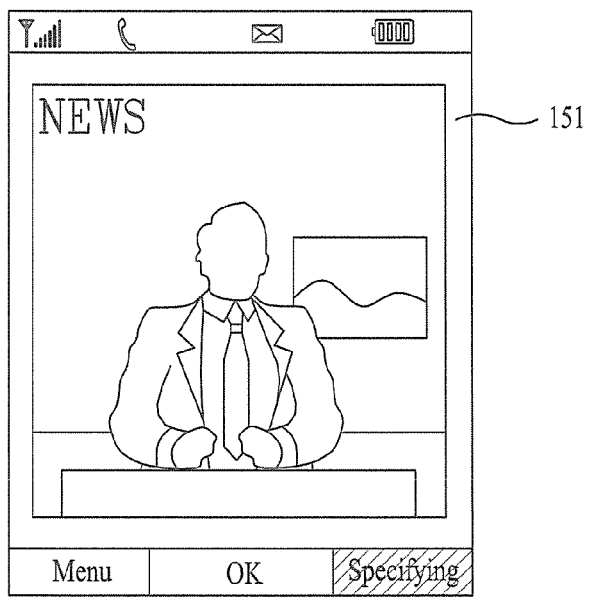
Figure 8D:
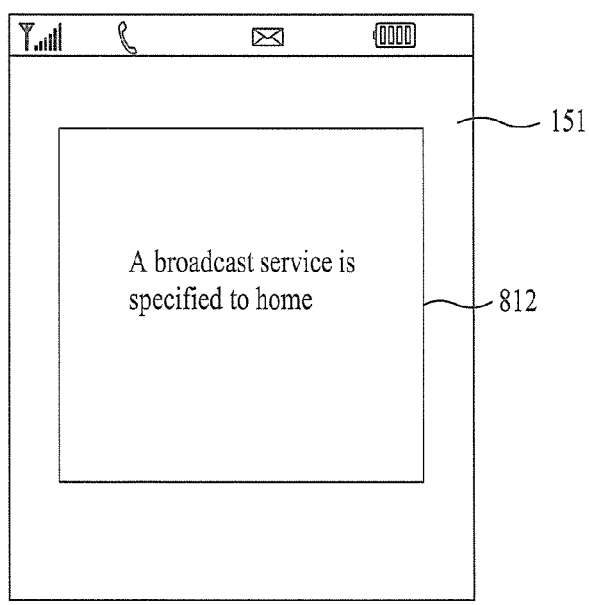

As illustrated in FIG. 8C and FIG. 8D, the communication device 100 may specify a broadcast service, such as TV broadcast, to a currently located place if the 'Specifying' area of the display 151 is activated while outputting broadcast signals. For example, the communication device 100 specifies a broadcast service to the home if 'Specifying' is activated while outputting a broadcast at home using the communication device 100.

As illustrated in FIGS. 8A to 8D, the communication device 100 may specify an operating application to correspond to a currently located place when an area or key for specifying an application is activated during random application operation. Although not illustrated, the communication device 100 may specify at least one application to correspond to a specific place in order of higher execution frequency for a predetermined period at the specific place in the absence of action by a user. Furthermore, the communication device 100 may specify at least one application to correspond to a specific place in order of higher execution necessity or higher execution possibility at the specific place in the absence of action by a user.

With further reference to FIG. 5, the communication device 100 may store the specified application according to location information (S510) as a map table in the memory 160. A map table of an application specified according to location information according to the present invention is explained in detail with reference to FIG. 9.

FIG. 9 illustrates a map table of an application specified according to location information according to the present invention in which location information is limited to POI information. It is contemplated that location information can include any one of coordinate information, administrative address information, setup name information and relative location information. As illustrated FIG. 9, a 'Broadcast service' and a 'Remote controller' are specified to correspond to 'Home' 911. Specifically, the 'Broadcast service' is set for execution when within 1 km of the 'Home' 911.

As illustrated in FIG. 9, 'Schedule management' and 'Electronic dictionary' are specified to correspond to 'Company' 912. Specifically, 'Schedule management' is set for execution when within 1 km of the 'Company' 912.

As illustrated in FIG. 9, 'Electronic dictionary' is specified to correspond to 'Library' 913. Furthermore, 'Electronic dictionary' is set for execution when within 1 km from the 'Library' 913.

As illustrated in FIG. 9, 'MP3' and a 'Wireless Internet' are specified to correspond to a 'Department store' 914. Specifically, the 'MP3' is set for execution when a speed exceeds 1 km/h and 'Wireless Internet' is set for execution when within 1 km of the 'Department store' 914.

As illustrated in FIG. 9, 'Camera' and 'MP3' are specified to correspond to a 'Park' 915. Specifically, 'Camera' is set for execution when within 1 km of the 'Park' and 'MP3' is set for execution when a speed exceeds 5 km/h.

As illustrated in FIG. 9, 'Broadcast service', 'Game', 'MP3' and 'Subway linemap' are specified to correspond to a 'Subway' 916. Specifically, 'Subway linemap' is set for execution when within 1 km from the 'Subway' 916.

As illustrated in FIG. 9, 'MP3' and 'Navigation' are specified to correspond to a 'Road' 917. Specifically, 'MP3' is set for execution when a speed exceeding 10 km/h and 'navigation' is set for execution when a speed exceeds 30 km/h.

As illustrated in FIG. 9, 'Broadcast service' and 'Electronic dictionary' are specified to correspond to a 'School' 918. Specifically, 'Electronic dictionary' is set for execution when within 1 km from the 'School' 918.

Referring again to FIG. 5, the communication device 100 receives information for location measurement via the wireless communication unit 110 (S503). The information for the location measurement can contain at least one of location information on each of a plurality of satellites via GPS, base station location information and network location information. Alternatively, the information for the location measurement may be obtained using an accelerometer provided in the communication device 100.

The communication device 100 measures its location using the received location measurement information (S505). Specifically, the communication device 100 may measure its location via the controller 180 or in response to a control signal from the controller using the position-location module 115.

The communication device 100 may also measure its location via coordinate information. The coordinate information can contain latitude, longitude, distance, speed, or time information.

The communication device 100 generates location information based on the measured location (S507). The controller 180 may execute the generation.

The communication device 100 is able to generate the location information as at least one of administrative address information based on coordinate information, POI information, setup name information and relative location information. The communication device 100 searches the memory 160 for application(s) specified to correspond to the generated location information (S509).

The communication device 100 may use the map table illustrated in FIG. 9 to search for the corresponding application. The controller 180 may search for the application(s) corresponding to the searched location information after the map table has been searched for location information matching the generated location information. For Example, the controller 180 may search the map table for the 'Broadcast service' and 'Remote controller' applications specified to correspond to the 'Home' 911 when the generated location information is 'Home'.

The communication device 100 displays an indicator of the searched application on the display 151 (S511). For example, the indicator of the searched application is displayed using at least one of an icon, a symbol, an image and text.

Displaying the indicator (S511) is explained in detail with reference to FIGS. 10A to 12B. For clarity and convenience of explanation, it is assumed that an application according to location information is specified based on the map table illustrated in FIG. 9.

Figure 10A:
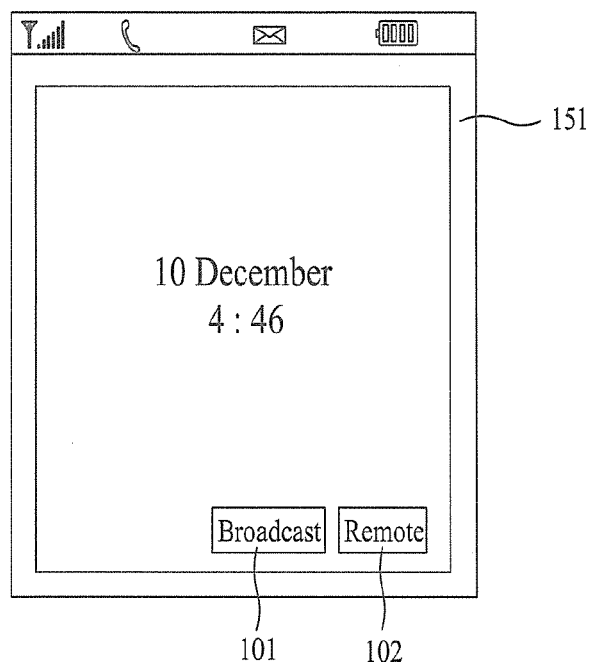
FIGS. 10A and 10B illustrate a first screen for displaying an indicator of an application specified according to location information in a communication device according to the present invention.
Figure 10B:
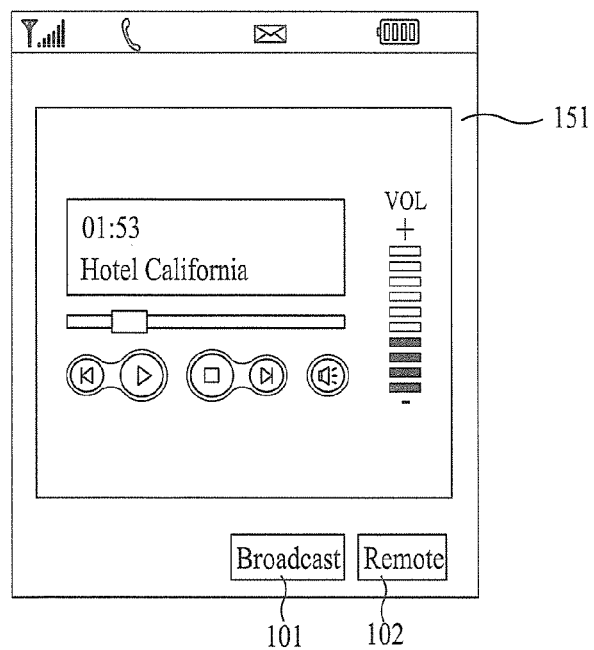

The communication device 100 displays an indicator 101 indicating 'Broadcast' service corresponding to 'Home' and an indicator 102 indicating 'Remote' controller corresponding to 'Home' while in a standby mode when the generated location information is 'Home', as illustrated in FIG. 10A. The communication device 100 also displays the same indicators 101, 102 while executing another application when the generated location information is 'Home', as illustrated in FIG. 10B.

Figure 11A:
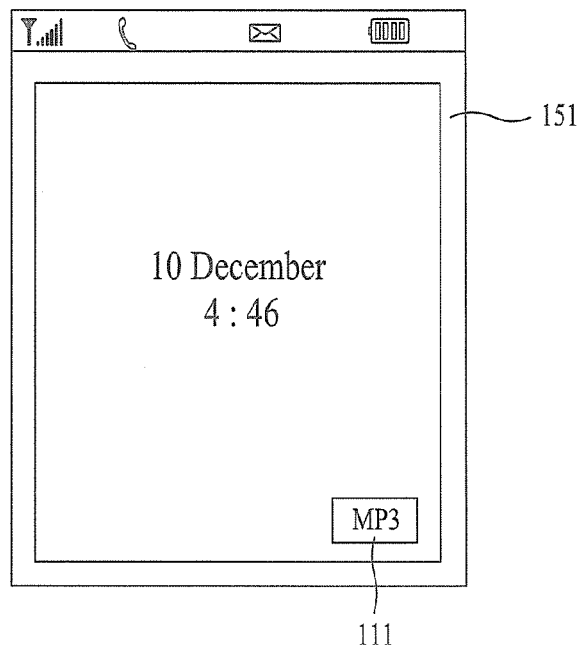
FIGS. 11A and 11B illustrate a second screen for displaying an indicator of an application specified according to location information in a communication device according to the present invention.
Figure 11B:
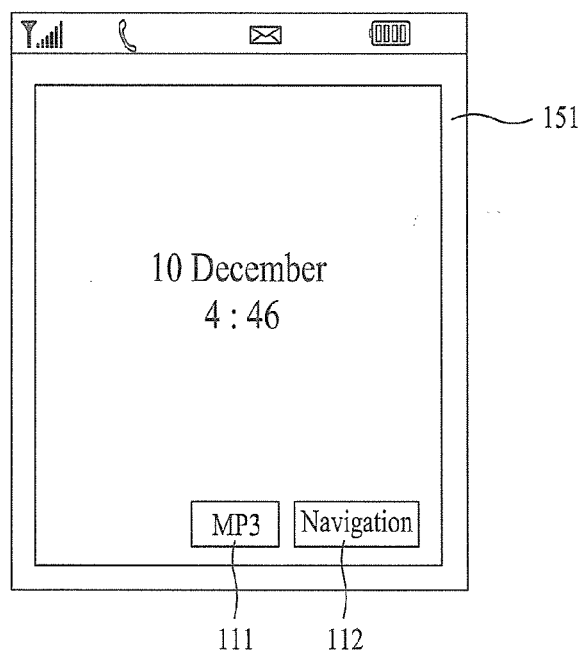

The communication device 100 displays an indicator 111 indicating 'MP3' at a speed between 10~30 km/h when the generated location information is 'Road', as illustrated in FIG. 11A. The communication device 100 displays indicators 111 and 112 indicating, respectively, 'MP3' and 'Navigation' at a speed exceeding 30 km/h when the generated location information is 'Road', as illustrated in FIG. 11B.

Figure 12A:
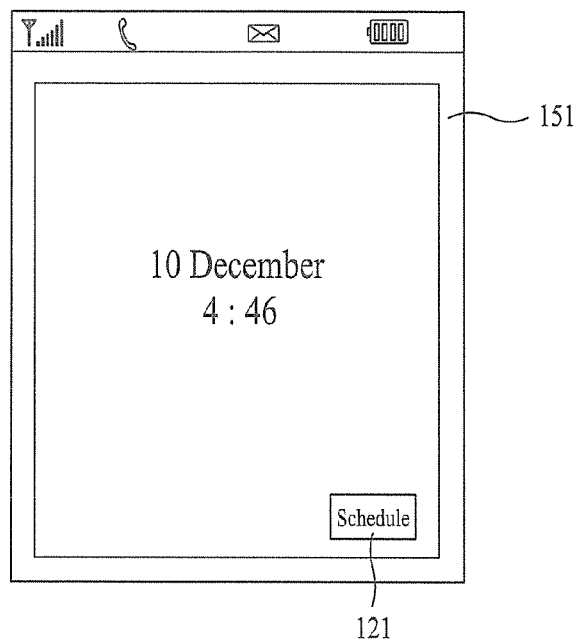
FIGS. 12A and 12B illustrate a third screen for displaying an indicator of an application specified according to location information in a communication device according to the present invention.
Figure 12B:
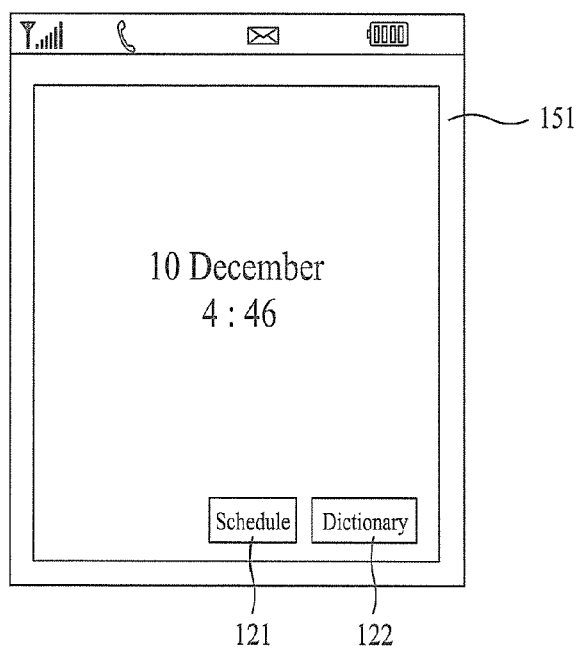

The communication device 100 displays an indicator 121 indicating 'Schedule' management when within 1 km of the 'Company' if the generated location information is 'Company', as illustrated in FIG. 12A. The communication device 100 displays indicators 121 and 122 indicating, respectively, 'Schedule' management and electronic 'Dictionary' when located at the 'Company' if the generated location information is 'Company', as illustrated in FIG. 12B.

Figure 13A:
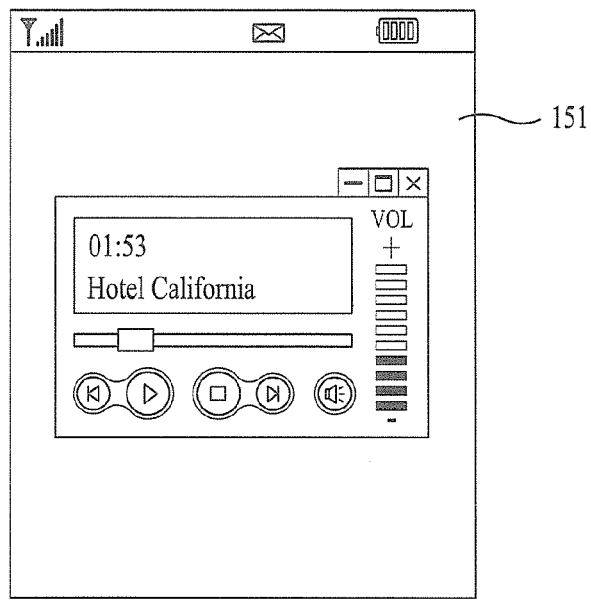
FIGS. 13A and 13B illustrate a screen of a process for executing an application specified according to location information in a communication device according an embodiment of the present invention.
Figure 13B:
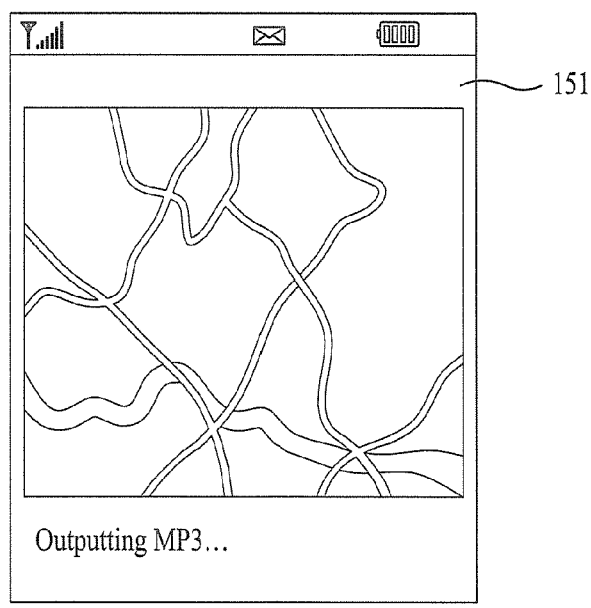

The communication device 100 is also able to directly execute application(s) corresponding to the generated location information. The communication device 100 executes 'MP3' at a speed between 10~30 km/h, as illustrated in FIG. 13A, and executes 'MP3' and 'Navigation' at a speed exceeding 30 km/h, as illustrated in FIG. 13B, if the generated location information is 'Road'.

Referring again to FIG. 5, the communication device 100 determines whether the application corresponding to the generated location information is changed in accordance with a change in its location (S513). For example, the communication device 100 determines that the application corresponding to the location information has changed based on the map table illustrated in FIG. 9 if a location of the communication device is shifted to 'Home' from 'Company'.

The communication device 100 stops displaying the indicator of the application corresponding to the previous location and displays an indicator of the application corresponding to the new location (S515) if it is determined that the application has changed. The communication device 100 continues to display the present application if it is determined that the application is not changed (S511).

The display of the indicator of the application according to the location change is explained in detail with reference to FIG. 14A and FIG. 14B. For clarity and convenience of explanation, the following description is based on the map table illustrated in FIG. 9.

Figure 14A:
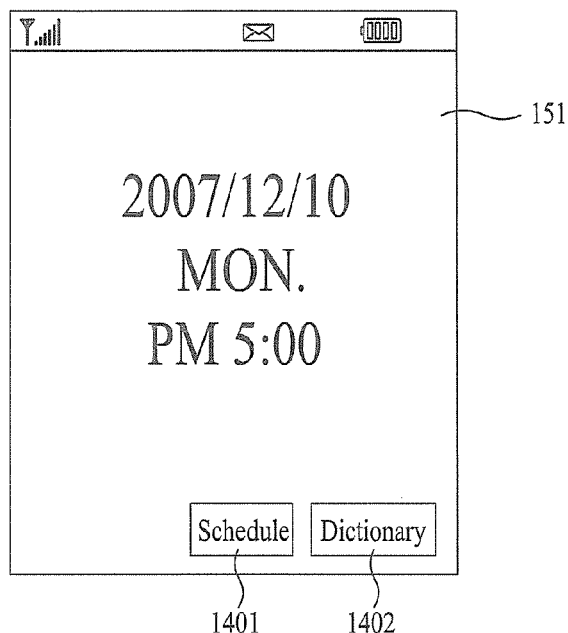
FIGS. 14A and 14B illustrate a screen displaying an indicator of an application specified according to location information in a communication device according to an embodiment of the present invention when the application specified according to the location information is changed due to a new location.
Figure 14B:
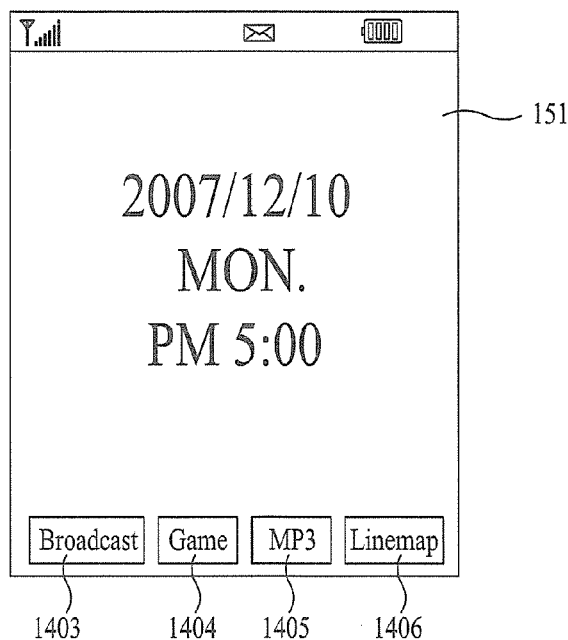

FIG. 14A and FIG. 14B illustrate a screen displaying an indicator of an application corresponding to location information in a communication device 100 according to the present invention when the application corresponding to the location information is changed in accordance with a changed location of the communication device. As illustrated in FIG. 14A and FIG. 14B, the communication device 100 stops displaying indicators 1401 and 1402 indicating, respectively, 'Schedule' management and electronic 'Dictionary' applications corresponding to 'Company' and displays indicators 1403, 1404, 1405 and 1406 indicating, respectively, 'Broadcast' service, 'game', 'MP3' and subway 'Linemap' applications when the location is shifted to 'Subway' from 'Company'.

The communication device 100 executes an application corresponding to the selected indicator (S519) if one of the displayed indicators is selected (S517). Selecting an indicator (S517) and executing a corresponding selected application (S519) are not mandatory for the present invention. Therefore, these steps may be omitted. Although not shown in the drawing, the communication device 100 may transmit a control signal to an external device in order to execute the application if an application needs to be executed in association with an external device.

Figure 15:
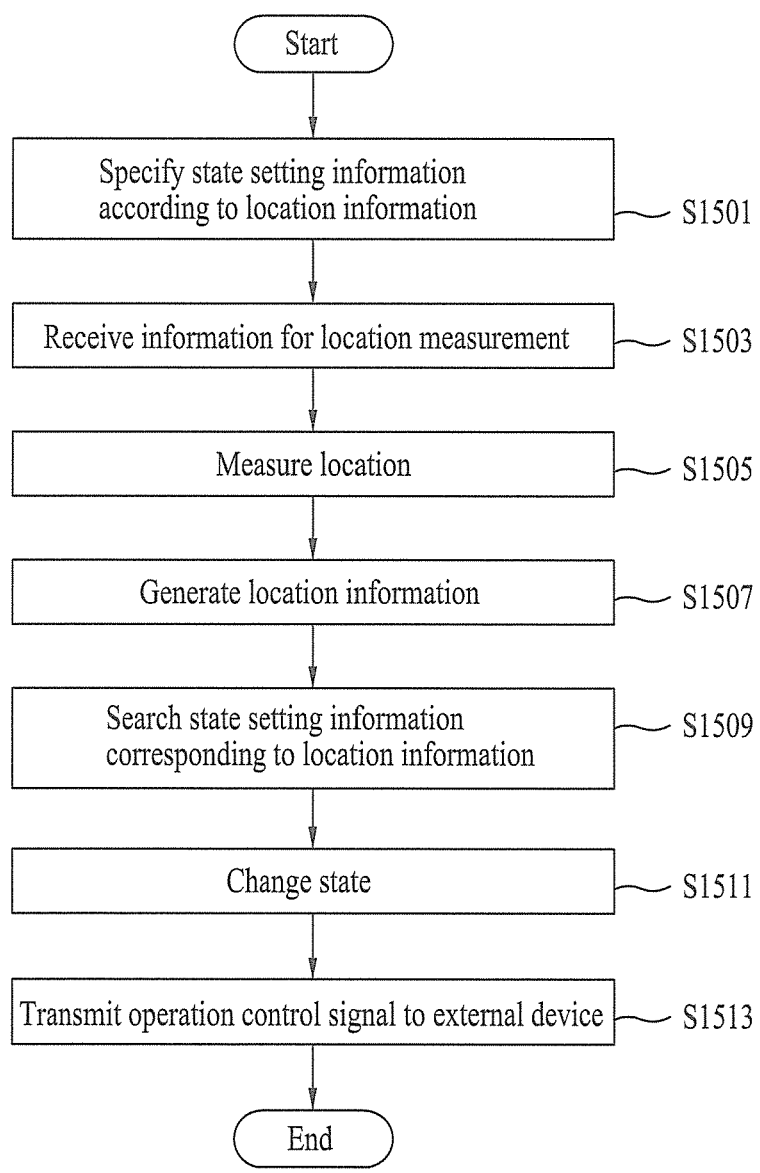
FIG. 15 is a flowchart of a second method of controlling an operation in a communication device according to the present invention.

A method for controlling an operation in a communication device 100 according to the present invention is explained with reference to FIG. 15. FIG. 15 is a flowchart for a second method of controlling an operation in a communication device 100 according to the present invention.

As illustrated in FIG. 15, the communication device 100 specifies state setting information according to location information (S1501). The location information that is a specified target of the state setting information may be directly input by a user via the user input unit 130 or may be selected by a user from location information previously stored in the memory 160, as previously explained with regard to FIGS. 6A to 6D.

An operation of specifying state setting information according to information is explained with reference to FIGS. 16A to 16E. For clarity and convenience of explanation, it is assumed that the location information that is a specified target of state setting information is previously inputted or selected. FIGS. 16A to 16E illustrate a screen of a process for specifying state setting information according to location information in a communication device 100 according to one embodiment of the present invention.

Figure 16A:
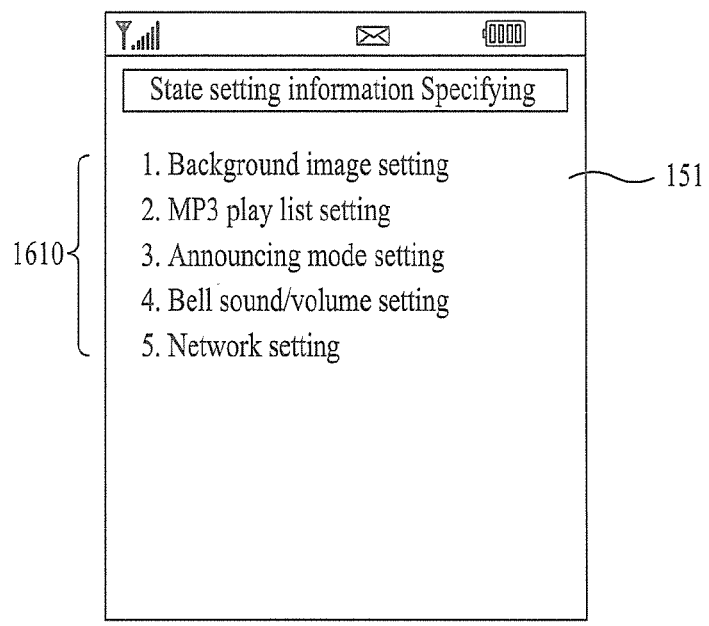
FIGS. 16A to 16E illustrate a screen of a process for specifying state setting information according to location information in a communication device according an embodiment of the present invention.

As illustrated in FIG. 16A, the communication device 100 displays a list 1610 including a plurality of state setting items on the display 151 when a state for specifying the state setting information according to the location information is set. For example, the list 1610 can contain background image setting, MP3 play list setting, announcing mode setting, bell sound/volume setting, or network setting.

Figure 16B:
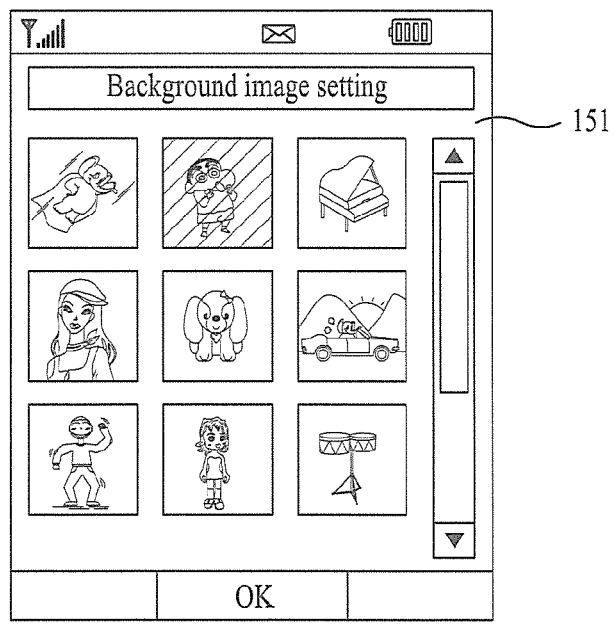

As illustrated in FIG. 16B, the communication device 100 displays an image list including at least one image settable as a background image if 'Background image setting' is selected from the list 1610. An image selected by a user from the image list may then be specified as a background image for corresponding location information.

Figure 16C:
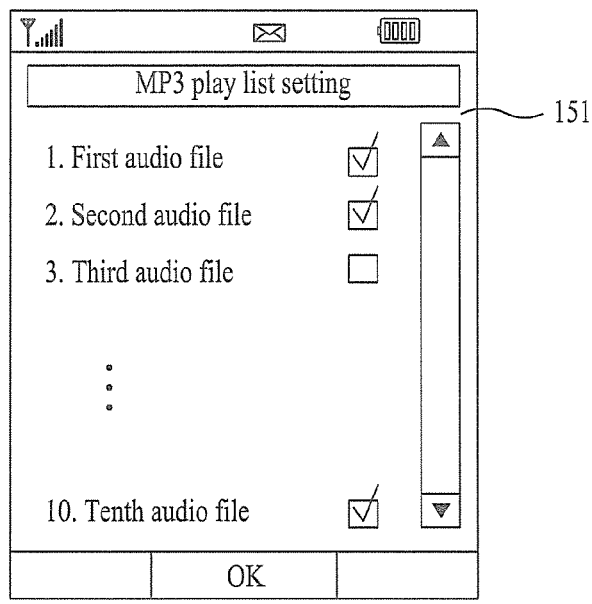

As illustrated in FIG. 16C, the communication device 100 displays a list of audio files playable by MP3 if 'MP3 play list setting' is selected from the list 1610. An audio file selected by a user from the list may then be specified as an MP3 play list for corresponding location information.

Figure 16D:
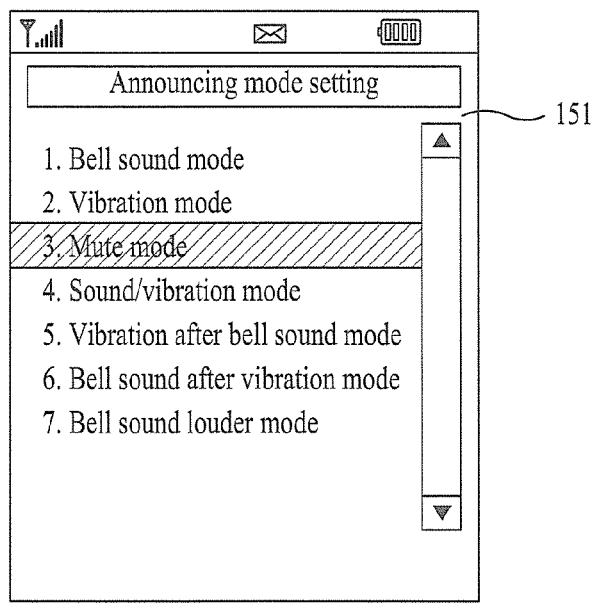

As illustrated in FIG. 16D, the communication device 100 displays an announcing mode list if 'Announcing mode setting' is selected from the list 1610. An announcing mode selected by a user from the list may then be specified as an announcing mode for corresponding location information.

Figure 16E:
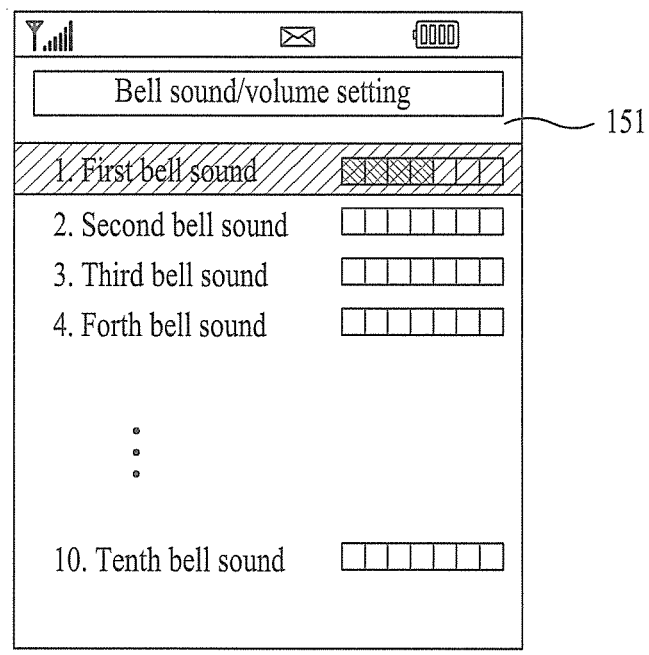

As illustrated in FIG. 16E, the communication device 100 displays a bell sound/volume list if 'Bell sound/volume setting' is selected from the list 1610. A bell sound/volume selected by a user from the list may then be specified as a bell sound/volume for corresponding location information.

Referring again to FIG. 15, the communication device 100 stores the state setting information specified according to the specified location information in the memory 160. Specifically, the state setting information according to the location information is stored in a map table format.

The map table of the state setting information according to the location information is explained in detail with reference to FIG. 17. FIG. 17 illustrates a map table of state setting information specified according to location information in an embodiment of the present invention in which location information is limited to POI information. As previously described, it is understood that location information can include at least one of coordinate information, administrative address information, POI information, setup name information and relative location information.

As illustrated in FIG. 17, a 'Second image' is specified as a background image corresponding to 'Home' 1711 and a 'First IP' address is specified as a 'Network access' address. Specifically, the 'Second image' is set for specification as a background image upon entry within 1 km from the 'Home' 1711.

As further illustrated in FIG. 17, a 'Third image' is specified as a background to 'Company' 1712, a 'Second IP' address is specified as a 'Network access' address, and a 'Vibration mode' is specified as an announcing mode. Specifically, all state setting information is set for specification upon entry within 1 km from the 'Company' 1712.

As further illustrated in FIG. 17, a 'Vibration mode' is set to be specified as the announcing mode to 'Department store' 1713 within 1 km from the 'Department store'. As further illustrated in FIG. 17, a 'Bell sound mode' is set for specification as an announcing mode to 'Road' 1715.

As further illustrated in FIG. 17, a 'Vibration mode' is specified as an announcing mode to 'Subway' 1714 and an 'MP3 play list' is separately specified. Specifically, a separate 'MP3 play list' is set for specification when within 1 km from the 'Subway' 1714.

As further illustrated in FIG. 17, a 'First image' is specified as a background image to 'School' 1716 and a 'Lamp mode' is specified as an announcing mode to the 'School'. Specifically, all state setting information is set for specification when within 1 km from the 'School' 1716.

Referring again to FIG. 15, the communication device 100 receives information for location measurement (S1503) and then measures its location using the received information (S1505). The communication device 100 then generates location information based on the measured location (S1507).

The processes for receiving information (S1503), measuring location (S1505) and generating location information (S1507) are identical the same processes illustrated in FIG. 5. Therefore, details are omitted in the following description.

The communication device 100 searches the memory 160 for state setting information corresponding to the generated location information (S1509). As previously disclosed, the communication device 100 may search the map table of state setting information according to location information stored in the memory 160.

The communication device 100 searches the map table for location information matching the generated location information and is then able to search for state setting information corresponding to the searched location information. For example, the communication device 100 searches search the map table illustrated in FIG. 17 for 'Second image' as a background image as state setting information corresponding to 'Home' and 'First IP' address as a 'Network access' address if the generated location information is 'Home'. The communication device 100 then changes its state in accordance with the searched state setting information (S1511).

As illustrated in FIG. 17, the communication device 100 sets the background image to the 'Second image' and also sets the 'Network access' address to the 'First IP' address if the generated location information is 'Home'. As further illustrated in FIG. 17, the communication device 100 sets an announcing mode to a 'Vibration mode' and configures an 'MP3 play list' separately if the generated location information is 'Subway'.

Specifically, the communication device 100 changes its state to correspond to changed sate setting information when state setting information according to location information is changed due to a new location.

As illustrated in FIG. 18, the communication device 100 stops displaying 'Second image' as the background image specified to 'Home' and displays 'First image' as a background image specified to 'School' upon moving to 'School' from 'Home'.

Referring again to FIG. 15, the communication device 100 may transmit an operation control signal to an external device in accordance with the searched state setting information (S1513). Therefore, the communication device 100 is able to facilitate performing an operation corresponding to state setting information in association with the external device.

The method for controlling an operation according to the present invention can be implemented in a program recorded medium as computer-readable codes. The computer-readable media include all types of recording devices in which data readable by a computer system are stored.

The computer-readable media include ROM, RAM, CD-ROM, magnetic tapes, floppy discs, optical data, and storage devices and also include carrier-wave type implementations, such as transmission via Internet. Furthermore, the computer can include the controller 180 of the communication device 100.

The present invention provides several effects or advantages. First, the present invention allows a user to select an application specified according location information. Second, the present invention enables a state to be set in accordance with state setting information specified according to location information.

It will be apparent to those skilled in the art that various modifications and variations can be made in the present invention without departing from the spirit or scope of the inventions. Therefore, it is intended that the present invention covers the modifications and variations of this invention provided they come within the scope of the appended claims and their equivalents.

Depending on implementation, it is possible that the present invention can take the form of an entirely hardware embodiment, an entirely software embodiment or an embodiment containing both hardware and software elements. A software embodiment may include, but not be limited to, to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Other components may be coupled to the system. Input/output or I/O devices (including but not limited to keyboards, displays, pointing devices, etc.) can be coupled to the system either directly or through intervening I/O controllers. Network adapters (e.g., modem, cable modem, Ethernet cards) may also be coupled to the system to enable the data processing system to become coupled to other data processing systems or remote printers or storage devices through intervening private or public networks.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may be comprise one or more modules that execute on one or more processors in a distributed, non-distributed, or multiprocessing environment.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The foregoing embodiments and advantages are merely exemplary and are not to be construed as limiting the present invention. The present teaching can be readily applied to other types of apparatuses.

The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A communication device, comprising:
  a touchscreen configured for displaying information and receiving a user input;
  a wireless communication unit configured for determining a current location of the communication device; and
  a controller configured for:
    generating a set of information comprising a pre-defined location, a first pre-defined speed, and a first pre-defined application associated with the pre-defined location and the first pre-defined speed in response to the user input;
    determining whether the determined current location substantially corresponds to the pre-defined location and whether a current speed is equal to or greater than the first pre-defined speed;
    searching for the first pre-defined application corresponding to the pre-defined location when the determined current location substantially corresponds to the pre-defined location; and
    controlling the touchscreen to display a first indicator to indicate a presence of the first pre-defined application when the determined current location substantially corresponds to the pre-defined location and the current speed is equal to or greater than the first pre-defined speed,
  wherein:
    the pre-defined location corresponds to a specific location determined in response to the user input such that the specific location is a location at which the communication device is positioned at a time when at which the user input is received;
    the first pre-defined speed corresponds to a specific speed at the time the user input is received; and
    the first pre-defined application corresponds to a specific application being executed at the time the user input is received.

2. The communication device of claim 1, wherein the controller is further configured for controlling the touchscreen to not display the first indicator when the first pre-defined application is not available.

3. The communication device of claim 1, wherein the controller is further configured for executing the first pre-defined application in response to selection of the displayed first indicator.

4. The communication device of claim 1, wherein the controller is further configured for:
  searching for setting information corresponding to the pre-defined location; and
  changing a state of the communication device according to the setting information.

5. The communication device of claim 4, wherein the setting information is related to at least a background image, an announcing mode, or a network change.

6. The communication device of claim 5, wherein the wireless communication unit is further configured for transmitting an operation control signal to an external device according to the setting information.

7. The communication device of claim 1, wherein if the current speed exceeds a second pre-defined speed which is greater than the first pre-defined speed, the controller is further configured for controlling the touchscreen to further display a second indicator to indicate a presence of a second pre-defined application.

8. The communication device of claim 7, wherein if the current speed is equal to or exceeds the second pre-defined speed, the controller is further configured for controlling the touchscreen to display both the first indicator and the second indicator.

9. The communication device of claim 1, wherein determining whether the determined current location substantially corresponds to the pre-defined location does not require a user input.

10. The communication device of claim 9, wherein determining whether the current speed is equal to or greater than the first pre-defined speed does not require a user input.

11. The communication device of claim 10, wherein controlling the touchscreen to display the indicator does not require a user input.

12. A method of controlling an operation in a communication device, the method comprising:
  generating a set of information comprising a pre-defined location, a pre-defined speed, and a pre-defined application associated with the pre-defined location and the pre-defined speed in response to a user input;
  determining a current location and a current speed of the communication device;
  determining whether the determined current location substantially corresponds to the pre-defined location and the current speed is equal to or greater than the pre-defined speed;
  searching for the pre-defined application corresponding to the pre-defined location when the determined current location substantially corresponds to the pre-defined location; and
  displaying an indicator to indicate a presence of the pre-defined application when the determined current location substantially corresponds to the pre-defined location and the determined current speed is equal to or greater than the pre-defined speed,
  wherein:
  the pre-defined location corresponds to a specific location determined in response to the user input such that the specific location is a location at which the communication device is positioned at a time when at which the user input is received;

the pre-defined speed corresponds to a specific speed at the time the user input is received; and the pre-defined application corresponds to a specific application being executed at the time the user input is received.

13. The method of claim 12, wherein the indicator is not displayed when the pre-defined application associated with the pre-defined location is not available.

14. The method of claim 12, further comprising:
   receiving a selection of the displayed indicator; and
   executing the pre-defined application in response to the selection of the indicator.

15. The method of claim 12, further comprising:
   searching for setting information corresponding to the pre-defined location; and
   changing a state of the communication device according to the setting information.

16. The method of claim 15, wherein the setting information is related to at least a background image, an announcing mode, or a network change.

17. The method of claim 16, further comprising transmitting an operation control signal to an external device according to the setting information.

* * * * *